United States Patent [19]

Block

[11] 4,169,975

[45] Oct. 2, 1979

[54] TWO-PHASE TRANSFORMER AND WELDING CIRCUIT THEREFOR

[76] Inventor: Merrill Block, 1736 Woodward, SE., Grand Rapids, Mich. 49506

[21] Appl. No.: 813,787

[22] Filed: Jul. 8, 1977

[51] Int. Cl.² .............................................. B23K 9/10
[52] U.S. Cl. .................................... 219/116; 219/492;
 323/44 R; 357/68; 357/71; 361/149
[58] Field of Search .................. 219/115, 492, 116, 88;
 361/149, 3, 39, 152, 153; 357/68; 323/44 R;
 174/117.11

[56] References Cited

U.S. PATENT DOCUMENTS

| 2,200,776 | 5/1940 | Hoover | 174/117.11 |
| 2,634,396 | 4/1953 | Solomon | 323/18 |
| 3,412,294 | 11/1968 | Sciaky | 219/116 |
| 3,460,022 | 8/1969 | Riley | 219/116 |
| 3,495,067 | 2/1970 | Sciaky | 219/116 |
| 3,735,089 | 5/1973 | Sciaky | 219/116 X |
| 3,840,720 | 10/1974 | Wolf | 219/116 |

FOREIGN PATENT DOCUMENTS

194939  6/1967  U.S.S.R. .................................... 363/3

OTHER PUBLICATIONS

I.B.M. disclosure, "AC to DC", vol. 6, #3, Aug. 1963, pp. 45-46.

Primary Examiner—Bruce A. Reynolds
Assistant Examiner—M. Paschall
Attorney, Agent, or Firm—John E. McGarry

[57] ABSTRACT

An apparatus for converting three-phase electrical energy into direct current includes Scott-connected transformers with oppositely biased SCRs connected in parallel to two of three input terminals. The SCRs are controlled so that they fire in alternate and rotating sequence between the two input terminals. The secondary output voltages of four terminals are rectified so that the common rectified output voltage is a substantially DC voltage with a minimum ripple. The secondary output terminals are aligned in a common plane and are connected to deformable, tapered leads. The rectifiers are connected between the deformable leads and to a common slotted, conductive plate which is connected to a welding electrode. A center tap from each of the secondary windings is connected to another welding electrode. The deformable tapered leads and the slotted conductive plate provide an equal resistive path for pairs of rectifiers for each secondary output to equalize the current flow through the two sets of diodes.

12 Claims, 4 Drawing Figures

# TWO-PHASE TRANSFORMER AND WELDING CIRCUIT THEREFOR

BACKGROUND OF THE INVENTION

1. Field of the Invention

This invention relates to converting alternating current to direct current. In one of its aspects, the invention relates to a resistance welding apparatus utilizing Scott-connected transformers for converting three-phase alternating current to direct current.

2. State of the Prior Art

DC welding systems are typically provided by converting three-phase electrical energy to direct current through a three-phase transformer with rectified outputs. For example, see U.S. Pat. Nos. 2,221,576 to Dawson (issued Nov. 12, 1940), Aldenhoff 3,339,107 (issued Aug. 29, 1967), Riley 3,460,022 (issued Aug. 5, 1969) and Wolf 3,840,720 (issued Oct. 8, 1974). Such three-phase systems are bulky and require expensive controls to control the firing input or output voltages to produce a smooth output voltage pattern with substantially constant conduction and minimum ripple effect.

Sciaky, in U.S. Pat. No. 3,495,067 (issued Feb. 10, 1970), discloses the use of Scott-connected transformers to convert three-phase alternating current to direct current. Conductive coils are provided in the secondary circuit for adjusting the inductance of the conductors in the secondary circuit so as effect the correct commutation of current from one phase to the next in the primary. This system is expensive, cumbersome and, without a precise timed primary is somewhat inaccurate as a balancing means.

In welding apparatus, the secondary output terminals from the transformers are typically connected to diode assemblies which rectify the output current. The direct current terminals of the diodes are connected together so that the common output from the diodes has a relatively constant DC voltage during the welding cycle. In some cases, multiple diodes are connected to the secondary output terminals. Different conductor lengths may result in unequal current division among the rectifier cells in any given array. Riley, in U.S. Pat. No. 3,460,022 (issued Aug. 5, 1969), discloses the use of a looped AC connector in the form of a rectangular frame to enhance equal current division among diode cells. Further, slots are used in the frame to further enhance current division along any given row of such diode cells. Flexible braided leads are provided between the diodes and the rectangular frame. These braided leads have limited current carrying capacity. Therefore, multiple diodes must be used when these braided connectors are used.

SUMMARY OF THE INVENTION

According to the invention, unique control means are provided for regulating the voltage supply to first and second primary input terminals of Scott-connected transformers for converting three-phase alternating current to direct current. Two primary windings of the Scott-connected transformers have three input terminals for connecting to a three-phase power supply, a pair of secondary windings with output terminals at opposite ends thereof and a center tap output terminal connected to the center of each secondary winding. Means connecting the secondary output terminals together rectify the output voltages therefrom to produce a substantially constant direct current voltage.

The control means provides for the application of a voltage to the first and the second primary terminals alternately through each 90° phase of the electrical cycle. The first input terminal is connected to one end of one primary winding and a second input terminal is connected to an end of the other primary winding. The third input terminal is connected to an opposite end of the first mentioned primary winding. The three-phase power supply is connected to the input terminals such that the phase rotation is from first to the third to the second input terminal. By this arrangement, the rectified output from the rectifying means is substantially conductive throughout the entire electrical cycle and the ripple effect due to transformation of alternating to direct current is minimized.

The control means includes first and second oppositely biased, gated rectifying means connected in parallel to the first input terminal and a third and fourth oppositely biased, gated rectifying means connected in parallel to the second input terminal. Means are further provided for gating the first rectifier means during a first 90° time interval, for gating the third rectifying means during a second 90° time interval, for gating the second rectifying means during a third 90° time interval, and for gating the fourth rectifying means during a fourth 90° time interval. Desirably, the gated rectifying means are silicon controlled rectifiers or ignitron tubes. The control means eliminates the need for inductive reactances in the secondaries.

Also, according to the invention, deformable leads are connected between each of the secondary output terminals and the rectifying means. A common conductor plate member is provided and means mount the rectifying means between the common conductor plate and the deformable leads so that the leads can respond to any thickness variations of the diodes for application of equal pressure to each diode. To this end, the leads are formed from laminated thin straps of conductive material. Preferably, two or more diodes are provided between each lead and conductor plate and the leads have a first thickness adjacent the output terminals and a second thickness substantially less than the first thickness at the second diode and remote from the secondary output terminals. Further, the conductor plate is slotted between the two sets of diodes to provide an equal resistive current path so that the voltage drop across both sets of diodes is substantially equalized.

Desirably, the secondary output terminals are positioned in a common plane to facilitate mounting of the diodes through the deformable leads to the common conductor plate and easy accessibility to replacement of the diode.

BRIEF DESCRIPTION OF THE DRAWINGS

The invention will now be described with reference to the accompanying drawings in which.

DESCRIPTION OF THE PREFERRED EMBODIMENTS

Figure 1:
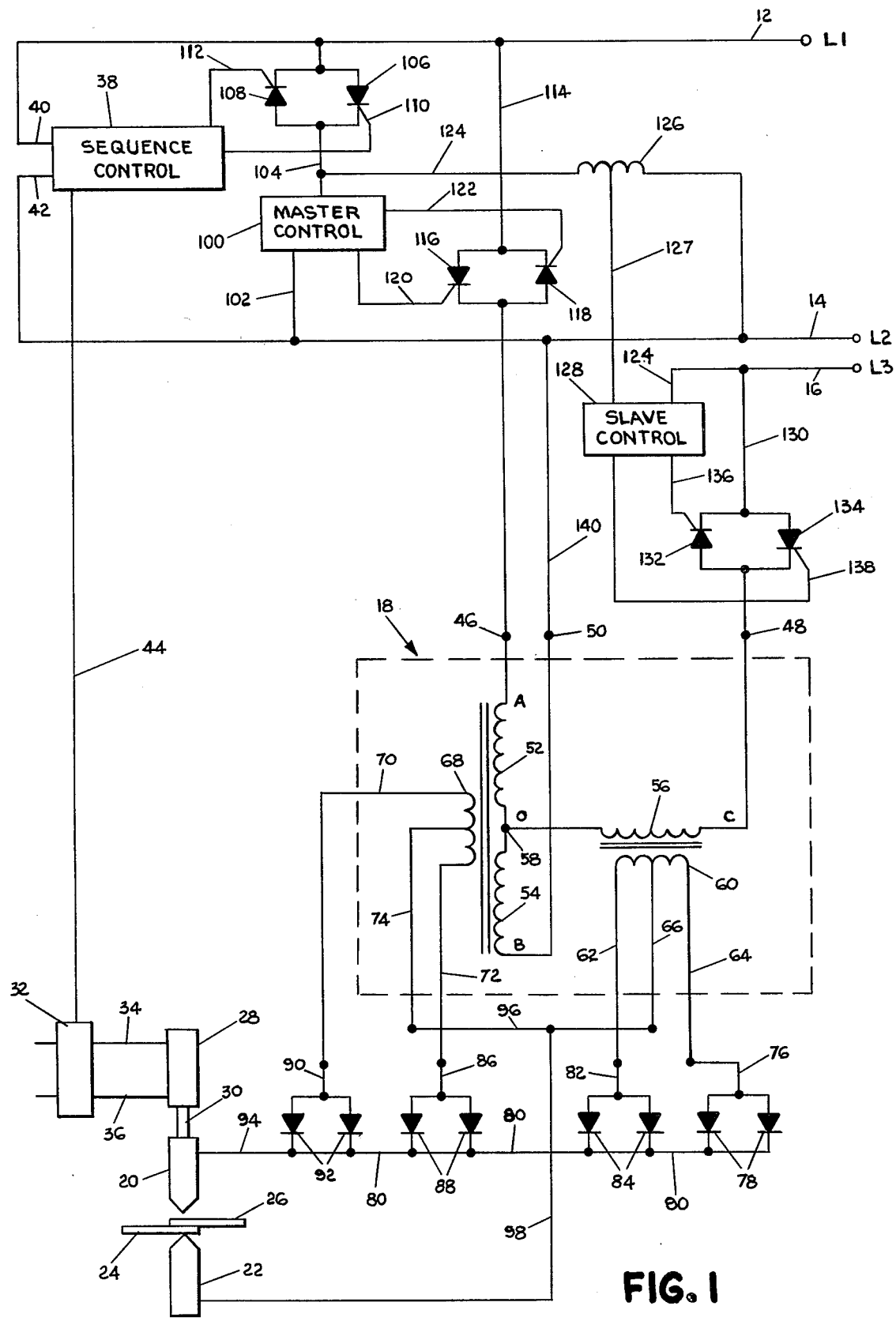
FIG. 1 is a schematic electrical diagram of a welding circuit according to the invention.

Referring now to the drawings, and to FIG. 1 in particular, there is shown a three-phase power supply system including power supply lines 12, 14 and 16 which are connected to Scott-connected transformers 18. The output from the Scott-connected transformers 18 is applied to welding electrodes 20 and 22 to weld work pieces 24 and 26 together. A hydraulic (or air) cylinder 28 having a reciprocal rod 30 mounts the electrode 20 for movement into contact with and out of contact with the work piece 26 during the welding cycle. A control valve 32 controls the flow of fluid through lines 34 and 36 to control the flow of fluid to the hydraulic cylinder 28.

A sequence controller 38 is connected to voltage input lines 40 and 42 and is adapted to control the operation of valve 32 in a predetermined timed sequence through a control line 44.

The transformer 18 has three input terminals 46, 48 and 50 through which the transformer is connected to the power supply lines 12, 14 and 16. The input terminals 46, 48 and 50 are respectively connected to primary windings 52, 56 and 54 which are connected together at a common point 58. Windings 52 and 54 have an equal number of turns and the sum of the turns of windings 52 and 54 is greater than the number of turns of the windings 56. In a standard Scott-connected transformer, the number of turns on the primary winding 56 is approximately equal to 0.866 times the sum of the windings 52 and 54.

Secondary windings 60 are wound to react to current in primary windings and have output leads 62 and 64 and a center tap output 66. Secondary windings 68, which are wound to react to the primary windings 52 and 54, have output leads 70 and 72 and a center tap lead 74.

The output lead 64 is connected to a pair of parallel connected diodes 78 through a deformable lead 76. If desirable, one or more than two diodes can be connected to each deformable lead. The output from diodes 78 are connected to a common conductor plate 80. In similar fashion, output lead 62 is connected to the common conductor plate 80 through a deformable lead 82 and a pair of parallel connected diodes 84. Output lead 72 is connected to the common conductor plate 80 through a pair of parallel diodes 88 and a deformable lead 86. Likewise, the output lead 70 is connected to the common conductor plate 80 through a deformable lead 90 and a pair of parallel connected diodes 92. The common conductor plate 80 is connected to the electrode 20 through lead 94. The center tap output leads 66 and 74 are connected to a common conductive plate 96 which in turn is connected to the welding electrode 22 through a connecting lead 98.

A master controller 100 is connected between power supply lines 12 and 14 and controls the firing of the transformers. To this end, the controller is connected to line 14 through a lead 102 and is connected to the power supply line 12 through lead 104 and a pair of oppositely biased silicon control rectifiers (SCR) 106 and 108. The gate of silicon control rectifier 106 is connected to the sequence controller 38 through control line 110 for control of SCR 106. In like manner, the gate of the silicon control rectifier 108 is connected to the sequence controller 38 through control line 112 for controlling the firing of SCR 108. The input terminal 46 is connected to power supply line 12 through a lead 114 and through a pair of oppositely biased SCRs 116 and 118. The master controller 100 gates SCRs 116 and 118 through control lines 120 and 122, respectively.

A lead 124 is connected at one end to the input lead 104 and at the other end to the power supply line 14 through an inductance coil 126. A center tap lead 127 on the inductance coil 126 is connected to a slave control 128. In addition, the slave control is connected to the power supply line 16 through lead 129.

The input terminal 48 of the winding 56 is connected to the power supply line 16 through oppositely biased SCRs 132 and 134 which are gated by the slave control 128 through control lines 136 and 138 respectively. A lead 140 connects the power supply line 14 directly to the transformer input terminal 50.

The sequence controller is a conventional controller which controls the sequence of operation of the welding machine. The sequence of operation of the welding machine is conventional and is as follows: During a first time interval, known as the squeeze time, the gates to the SCRs 106 and 108 are open and no function is performed by the master control 100. However, the sequence controller 38 controls the valve 32 to extend the rod 30, thereby bringing the electrode 20 down into contact with the work 26. After the contact between the electrode and the work is complete, the firing cycle takes place. In this cycle, the sequence controller 38 will close the SCRs 106 and 108, thereby activating the master controller 100. Rectified input pulses which are a function of the wave pattern in the power supply line 12 produce output signals in leads 120 and 122 for gating the SCRs 116 and 118. In this manner, the SCRs 116 and 118 are gated to apply rectified voltage pulses during selected time intervals to the input terminal 46.

The coil 126 with the center tap 127 shifts the phase of the pulses in lead 104 90° to the slave controller 128. The slave controller 128 is adapted to gate the SCRs 132 and 134 responsive to the rectified input pulses from the center tap 127.

The master control 100 and the slave control 128 are adapted to control the firing of the SCRs 116, 118, 132 and 134 in a given sequential pattern to balance the input from the three-power supply lines. In the embodiment illustrated in the invention, the firing of the SCRs is in the sequence of 116, 132, 118 and 134. Thus, during the first part of the firing cycle, SCR 116 will be gated during the first 90° of the wave pattern of the voltage in power supply line 12. Subsequent thereto, SCR 116 is opened and SCR 132 is closed, thereby passing current between power supply line 16 and input terminal 48. Subsequent to the second 90° phase of the wave pattern, SCR 132 is opened by the slave control 128 and SCR 118 is closed by the master control 100. After the third 90° period, the master control 100 will open the SCR 118 and the slave control 128 will close the SCR 134. Thus, the input terminals 46 and 48 rotate every 90° with respect to input voltage applied thereto. As a result, alternating current will be generated in the secondary coils 60 and 68 and output voltage will be generated at output leads 70, 72, 62 and 64. The sequence of operation is lead 70, lead 62, lead 72 and lead 64. The outputs are rectified in the diodes 92, 88, 84 and 78 so that a DC current is applied during the firing cycle through lead 94 to the electrode 20. The electrode 22 provides the ground lead through lead 98 for the system.

Subsequent to the firing cycle, the sequence controller 38 opens the SCRs 106 and 108 so that the master controller is closed off. The transformer 18 will thus have no power supplied thereto and there will be no output voltage between leads 94 and 98. The electrodes 20 and 22, however, are maintained in fixed position for a predetermined "hold time" while the weld solidifies. Thereafter, the sequence controller 38 will apply a control signal through control line 44 to the valve 32 to change the flow of pressure into the cylinder 28. In this manner, the rod 30 is withdrawn and the electrode 20 is raised.

Figure 2:
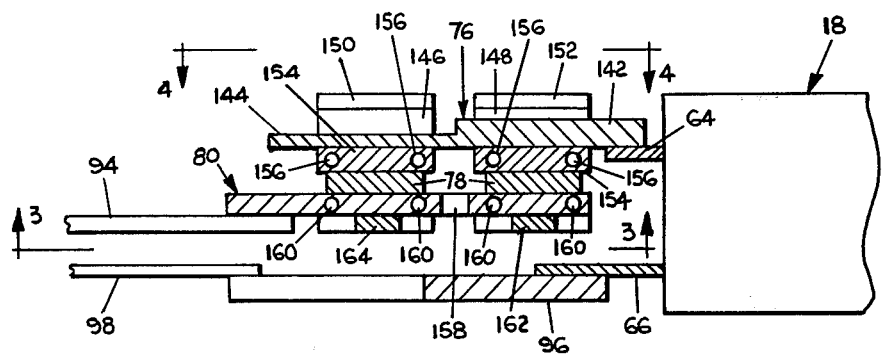
FIG. 2 is a side elevational view in section through a diode assembly used in the circuit according to the invention.
Figure 3:
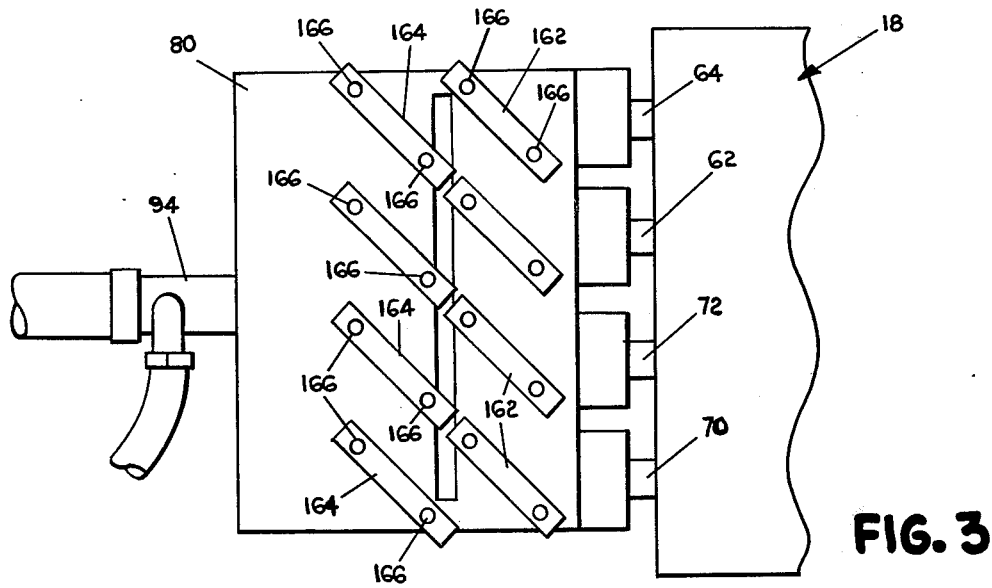
FIG. 3 is a plan view of the diode assembly seen along lines 3—3 of FIG. 2.
Figure 4:
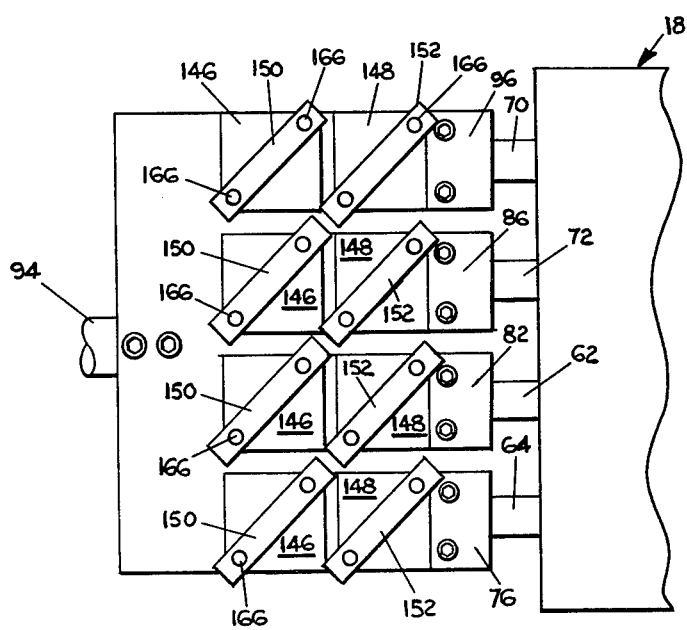
FIG. 4 is a plan view of the diode assembly seen along lines 4—4 of FIG. 2.

Reference is now made to FIGS. 2 through 4 which show the mounting of the diode assembly on the transformer. The four secondary output leads 64, 62, 72 and 70 are aligned in a common plane. That is to say, each of the output leads is formed of a relatively flat configuration with top and bottom surfaces of greater extent than other surfaces, and the top surfaces of the output leads lie entirely within a common plane. The deformable leads 76, 82, 86 and 96 are secured at one end to the secondary output leads 64, 62, 72 and 70, respectively. Each deformable lead has a thicker portion 142 adjacent to the secondary output leads and a thinner portion 144 remote from the secondary output leads. The thicker portion 142 is approximately twice the thickness of portion 144. Wafer diodes 78 are securely positioned between the deformable leads 76, 82, 86 and 96 at one end thereof and the common conductor plate 80 at the other end thereof. Chill blocks 154 having cooling water passages 156 are mounted between the diodes 78 and the deformable leads 76, 82, 86 and 96 for cooling the diodes 78. One set of four diodes is positioned beneath the thicker portion 142 of the flexible lead 76 and one set of four diodes is positioned beneath the thinner portion 144. Thus, the deformable lead 76 is tapered proportionally to the distance from the connection thereof to the secondary output leads of the transformer in order to provide a more equal resistive path for the two diodes in each set of diodes. Blocks 146 and 148 are positioned on top of the flexible lead 76 and spring straps 150 and 152 are positioned on top of the blocks 146 and 148 respectively. Spring straps 162 and 164 are positioned beneath the common conductor plate 80 in alignment with the spring straps 152 and 150 respectively. Bolts 166 mounted within insulated sleeves in bores which extend through plates 146, 148, deformable leads 76, chill blocks 156, connector plate 80 and through the straps 160 and 162 extend through the sleeves to secure the diode assemblies in place between the deformable leads 76, 82, 86 and 96 and the common plate 80. The spring straps 150, 152, 160 and 164 are spring steel straps which have a slight curvature at the central portion which bears against the adjacent plates. Thus, a predetermined amount of tension is applied to the bolts through the spring straps. The tension permit expansion and contraction of the diodes with varying temperature conditions while maintaining clamping pressure on the diode assembly.

The deformable leads 76, 82, 86 and 96 are desirably made from multiple laminated straps of deformable and conductive material such as copper. The leads are double thickness, for example ¾", at the thicker portions (142 for lead 76) compared with the thinner portions (144 for lead 76). The individual straps are, for example, 0.010" thick and 2-3 inches wide. The deformability of the leads are important so that all diodes can be mounted to the common plate without applying unequal pressure to different diodes. The leads deform as the diodes are secured in place between the leads and the conductive plate 80. This system of mounting the diodes provides a mechanism whereby any defective diode can be easily replaced without disassembly of the entire diode package.

As illustrated in FIGS. 2 and 3, the common conductor plate 80 has a series of slots 158 extending across the plates between the two sets of diodes to further assist in providing a more equal resistive path for the two diodes in each set of diodes. Further, cooling water passages extend through the plate 80 to prevent excessive heat buildup therein and to maintain the diodes relatively cool.

As illustrated in FIG. 2, the common conductor plate 96 is connected to the secondary output leads 66 and output lead 72 (not visible in FIG. 2). The connecting lead 98 is shown secured to the other end of the conductive plate 96.

With the use of the invention, a full 90° conduction time can be achieved in a welding apparatus and the magnitude of the ripple is significantly lower than that of a full-wave single-phase, direct current welding apparatus. Further, with the use of this system, the primary current will be spread evenly over all three lines. The Scott-connected transformer with the controls according to the invention is useful for welding aluminum, steel or other such materials. This system is compact in size, less costly to build (because of the simplified controls) and low on power consumption, because of the 90° conduction cycle and low ripple. Further, expensive and cumbersome reactant coils are not required.

Whereas the invention has been described with reference to a resistance welding apparatus, the invention can also be used for DC plating and arc welding apparatus.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. In a welding apparatus having Scott-connected transformers, three primary input terminals which are adapted to be connected to a three-phase power supply and four secondary output leads which are connected to a first electrode through wafer diode assemblies, the transformer further having a center tap output lead from each of the secondary coils, which center tap output lead is connected to a second welding electrode, whereby a DC circuit is made through the first and second electrodes, the improvement comprising:
   all of the four secondary output leads formed in a relatively flat configuration with top and bottom surfaces of greater extent than other surfaces of said leads, at least the top surfaces of each of said output leads lie entirely in a common plane;
   deformable leads formed of multiple laminated straps of conductive material connected between each of the output leads and the diodes for firmly supporting the diodes;
   a common conductor plate member of relatively flat configuration having a surface of greatest extent lying entirely in a plane parallel to the common plane of the output leads; and
   means clamping the diode assemblies under pressure between the common conductor plate and the deformable leads so that the leads deformably respond to any variation in thickness of the diodes as the diodes are secured in place so that equal pressure can be applied to each diode.

2. A welding apparatus according to claim 1 wherein first and second diodes are provided between each deformable lead and the common conductor plate; the deformable leads have a first thickness between the output leads and a point spaced therefrom beyond the first diode and a second thickness substantially less than the first thickness between the point and the outer ends of the leads, the second diode being mounted to the deformable lead at an area which includes the second thickness whereby the deformable leads are tapered in accordance with the distance from the secondary output leads to provide substantially equal resistive paths for each set of diodes.

3. A welding apparatus according to claim 2 wherein the second thickness is approximately half of the first thickness.

4. A welding apparatus according to claim 2 wherein the common conductor plate is slotted between the two sets of diodes.

5. In an apparatus for converting three-phase alternating current to direct current, said apparatus including transformers having Scott-connected primary windings with three input terminals for connection to a three-phase power supply, a pair of secondary windings with output terminals at opposite ends thereof, and a common center tap output terminal connected to the center of each secondary winding; a common conductor means for connecting together all of the secondary output terminals; and means for rectifying the output from each secondary output terminal; the improvement which comprises:
  control means for regulating the voltage applied to a first and second of the primary input terminals such that voltage applied to the first and second terminals alternates each 90° interval throughout the electrical cycle in such a manner that the current between each output terminal and the center tap output in the secondary windings conducts successively through each of the four output terminals during successive 90° intervals of the electrical cycle;
  the first input terminal being connected to one primary winding and the second input terminal being connected to the other primary winding;
  whereby the rectified output current between the common conductor means and the common center tap output terminal is substantially conductive throughout the entire electrical cycle and the ripple effect in the output is minimized.

6. An apparatus according to claim 5 wherein the control means includes first and second oppositely biased gated rectifying means connected in parallel to the first input terminal, and third and fourth oppositely biased gated rectifying means connected in parallel to the second input terminal; and the control means include means for gating the first rectifying means during a first time interval, means for gating the third rectifying means during a second time interval, means for gating the second rectifying means during a third time interval and means for gating a fourth rectifying means during a fourth time interval.

7. An apparatus according to claim 6 wherein the gated rectifying means are silicon controlled rectifiers.

8. An apparatus according to claim 7 and further comprising deformable leads connected between each of the output leads;
  the output terminals are formed in a relatively flat configuration with top and bottom surfaces of greater extent than other surfaces of said terminals, at least the top surfaces of each of said output terminals are all positioned entirely in a common plane;
  a common conductor plate member of relatively flat configuration having a surface of greatest extent lying entirely in a plane parallel to the common plane of the output terminals; and
  means mounting the diodes under pressure between the common conductor plate and the deformable leads so that the leads deformably respond to any variations in thickness of the diodes as the diodes are secured in place so that equal pressure can be applied to each diode.

9. An apparatus according to claim 8 wherein first and second diodes are connected between each deformable lead and the common conductor plate member; and the deformable leads have a first thickness adjacent to the secondary output terminals at the first diodes and a second thickness substantially less than the first thickness remote from the secondary output terminals at the second diodes;
  whereby equal resistive paths are provided for the first and second diodes.

10. An apparatus according to claim 9 wherein the common conductor plate member is slotted between the two sets of diodes, thereby further equalizing the resistive paths for each set of diodes.

11. A welding apparatus comprising the apparatus according to claim 10 and further comprising a first welding electrode electrically coupled to the common conductor plate member, and a second welding electrode electrically coupled to the center tap terminals.

12. In a welding apparatus having Scott-connected transformers with three primary input terminals which are adapted to be connected to a three-phase power supply and four secondary output leads which are connected to a first electrode through diode assemblies, the transformer further having a center tap output lead from each of the secondary coils, which lead is connected to a second welding electrode, whereby a DC circuit is made through the first and second electrodes, the improvement comprising:
  at least two of the four secondary output leads are formed in a relatively flat configuration with top and bottom surfaces of greater extent than other surfaces of said leads, at least the top surfaces of each of the two output leads lie entirely in a common plane;
  deformable leads connected between each of the output leads and the diodes for firmly supporting the diodes, the deformable leads comprising multiple straps of conductive material which are laminated together;
  a common conductor plate member of relatively flat configuration having a surface of greatest extent lying entirely in a plane parallel to the common plane of the two output leads; and
  means clamping the diode assemblies under pressure between the common conductor plate and the deformable leads so that the leads deformably respond to any variation in thickness of the diodes as the diodes are secured in place so that equal pressure can be applied to each diode.

* * * * *